Patented Sept. 16, 1947

2,427,343

UNITED STATES PATENT OFFICE 2,427,343

COMPOUNDS OF THE NORPINANE SERIES

Joseph P. Bain, Jacksonville, Fla., assignor, by mesne assignments, to The Glidden Company, Cleveland, Ohio, a corporation of Ohio No Drawing. Original application January 6, 1944, Serial No. 517,218. Divided and this application August 12, 1946, Serial No. 690,075

1 Claim. (Cl. 260—598)

The present invention relates to new compounds of the pinene group, and to the production of the same, and is a division of my co-pending application, Serial No. 517,218, filed January 6, 1944, for Compounds of the norpinane series and methods of making.

In my co-pending application Serial No. 399,214, filed June 21, 1941, now Patent No. 2,340,294, there is described a new dicyclic primary alcohol and its esters, prepared by condensing nopinene with anhydrous formaldehyde at temperatures from about 100° C. to 250° C. either in the presence or absence of non-resinifying acid catalysts, such as acetic acid, zinc chloride, etc. The reaction was thought to be as follows:

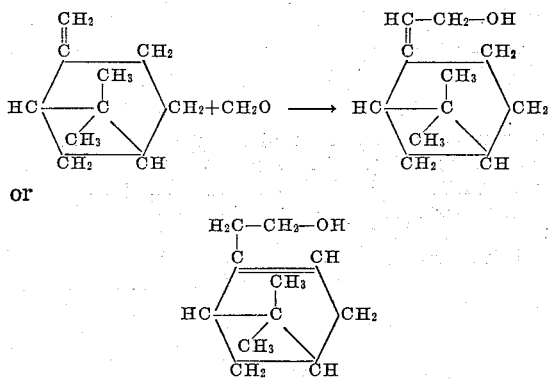

or

The alcohol has the following approximate characteristics:

B. P. at 10 mm. _____°C__ 110–112
Refractive index ($N_D^{25}$) _____ 1.49–1.493
Density at 25° C _____ 0.963–0.964
Optical rotation $_D^{10cm}$ ____degrees__ −35 to −37

Since the product is prepared from nopinene and is an alcohol, it will be referred to as "nopol."

It, and certain of its derivatives may be considered as apopinene compounds, but since there is no established numbering system for apopinane compounds, the numbering system for norpinane being:

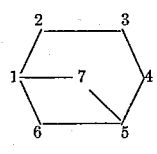

Norpinane

Beta pinene, according to this system is 6,6 dimethyl-2 methylene-norpinane, and nopol is B(6,6 dimethyl norpin-2-ene-2-) ethanol.

It has been found that the double bond of nopol may be hydrogenated to produce a new series of compounds of the pinane group. Such compounds do not exhibit the tendency to thermal isomerization shown by nopol and its esters. Also the new compounds do not in general exhibit the "pinene reactions" which are exhibited by nopol and its esters. The new compounds are therefore more stable. Primary terpene alcohols as well as terpene acid and aldehydes are useful in the medicinal, insecticidal and other fields and the stable products of the present invention are useful in such fields.

Example I

This example is illustrative of the preparation of nopol.

50 parts by weight of nopinene, 20 parts of paraformaldehyde, and 1 part of zinc chloride were heated at 80 to 120° C. The paraformaldehyde gradually dissolves in the course of several hours to give a clear solution. The crude nopol was distilled at 108–112° C. at 10 mm. pressure.

In another experiment 408 parts of nopinene and 60 parts of paraformaldehyde were heated in an autoclave at 200° C. for 3 hours. The crude alcohol was distilled under 10 mm. at 110–112° C.

Example II 322 grams of nopol was hydrogenated at 1000 to 1500 lbs./sq. in. pressure in the presence of 5 grams of Raney nickel catalyst at a temperature of 180–200° C. In 4.5 hours the alcohol had absorbed 44.1 liters of hydrogen and reduction was discontinued. The one double bond in this quantity of nopol theoretically requires the absorption of 43.4 liters of hydrogen.[1]

The product was then fractionated at 10 mm. pressure. The yield of hydro-nopol, B(6,6 dimethyl norpinane-2) ethanol, was 270 g., or 80.5% of theoretical, having a boiling point at 10 mm. of 123–125° C., $N_D^{25}$=1.4872–1.4878, and optical rotation $\alpha_D^{10cm.}$=27.53. The density at 25° C. was 0.961.

Example III 56 grams of hydronopol were dissolved in glacial acetic acid. A cool solution of 55 grams of chromium trioxide in 400 cc. acetic acid and 50 cc. of water was gradually added, the solution being cooled to keep the temperature below 60° C. After the addition of the oxidizing agent was complete, the mixture was warmed to 75° C. and ---
[1] Calculated to standard conditions of temperature and pressure.

poured into water. This mixture was then extracted with several portions of ether and the ether extracted with 10% NaOH. The soap solution was then extracted with ether to remove neutral materials and acidified. The precipitated oily acid was extracted with ether and the ether solution evaporated. On cooling the residue crystallized to give a high yield of the crude hydronopic acid, 6,6, dimethyl norpinane-2-acetic acid. Recrystallization from aqueous methanol gave the pure acid having a melting point of 56–58° C. Neutral equivalent calculated for hydronopic acid, 182.25; found 182.8, 181.8.

*Example IV*

Hydronopol was oxidized to the aldehyde by chromium trioxide in water solution at about 75° C. The alcohol, 168 parts, was stirred with 350 parts water containing 40 parts sulfuric acid. The temperature of the mixture was raised to 75° C. when 67 parts chromium trioxide in 100 parts water was added. After the reaction was complete the mixture was extracted with hexane and the extract fractionated at 10 mm. pressure. The fragrant aldehyde, 6,6, dimethyl norpinane-2-acetaldehyde, distilled at 95–100° C., $N_D^{25}$ 1.4805, alpha (10 cm. tube) —13.5. For purification it was shaken with a saturated solution of sodium bisulfite, the solid addition product formed was washed with hexane and dried. On dissolving the addition product in water and adding sodium carbonate the pure aldehyde was liberated. It yielded a semi-carbazone of melting point 161–161.5° C., (alpha)$^D$ —19.0 (2.0% in isopropanol).

The foregoing reactions are illustrated in the following scheme in which the alpha pinene structure of nopol is employed:

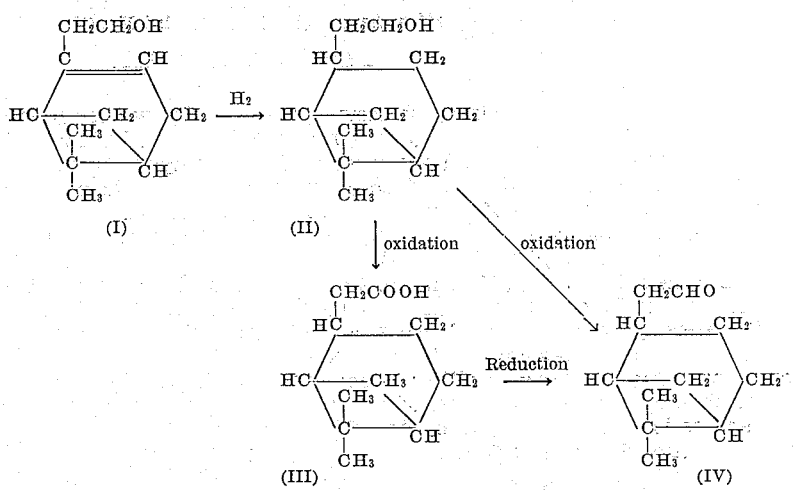

I. Nopol B (6,6-dimethyl norpin-2-ene-2) ethanol.
II. Hydronopol B (6,6-dimethyl-norpinane-2) ethanol.
III. 6,6-dimethyl norpinane-2-acetic acid.
IV. 6,6-dimethyl norpinane-2-acetaldehyde.

The novel acid shown in Figure III above is disclosed and claimed in my copending application Serial No. 690,076, filed August 12, 1946.

Having described the invention what is claimed is:

6,6 dimethyl norpinane-2-acetaldehyde.

JOSEPH P. BAIN.